(12) United States Patent
Soule et al.

(10) Patent No.: US 6,241,473 B1
(45) Date of Patent: Jun. 5, 2001

(54) PRESSURE RELIEF DEVICE FOR A PROPELLER HUB

(75) Inventors: Matthew C. Soule, Granby; Robert W. Pruden, Enfield; Thomas G. Corley, Suffield, all of CT (US)

(73) Assignee: United Technologies Corporation, Windsor Locks, CT (US)

( * ) Notice: Subject to any disclaimer, the term of this patent is extended or adjusted under 35 U.S.C. 154(b) by 0 days.

(21) Appl. No.: 09/305,758

(22) Filed: May 5, 1999

(51) Int. Cl.[7] .............................. B63H 3/00; B64H 11/34; F16K 17/14
(52) U.S. Cl. .......................... 416/42; 416/156; 137/68.23
(58) Field of Search .................. 137/68.23, 68.27, 137/68.29, 68.19; 416/147, 148, 155, 156

(56) References Cited

U.S. PATENT DOCUMENTS

| 3,039,482 | * | 6/1962 | Goldberg | 137/68.27 |
| 3,404,698 | | 10/1968 | Rouse . | |
| 3,635,234 | * | 1/1972 | Dawson | 137/68.25 |
| 4,146,047 | * | 3/1979 | Wood et al. | 137/68.26 |
| 4,195,745 | * | 4/1980 | Roberts et al. | 137/68.23 X |
| 4,645,420 | | 2/1987 | Warner . | |
| 5,411,158 | * | 5/1995 | Kays et al. | 137/68.1 X |
| 5,472,318 | | 12/1995 | Frank et al. . | |
| 5,507,501 | * | 4/1996 | Palmer | 137/68.11 X |
| 5,832,947 | | 11/1998 | Niemczyk . | |

FOREIGN PATENT DOCUMENTS

| 29603163 | 5/1996 | (DE) . |
| 0324617 | 7/1989 | (EP) . |
| 0823577 | 2/1998 | (EP) . |
| 1421955 | 12/1965 | (FR) . |
| 1205491 | 9/1970 | (GB) . |
| 2080494 | 2/1982 | (GB) . |
| WO9706057 | 2/1997 | (WO) . |

\* cited by examiner

Primary Examiner—John E. Ryznic

(57) ABSTRACT

A pressure relief device for preventing over pressurization of a propeller hub is disclosed. The pressure relief device is designed to fit within a ball hole opening in the hub arm of the hub. The pressure relief device includes a housing which sealably interfaces with an inner wall of the ball loading hole opening and a diaphragm which sealably interfaces with the housing. The diaphragm is designed to rupture at a design pressure thus venting the hub cavity.

7 Claims, 2 Drawing Sheets

PRESSURE RELIEF DEVICE FOR A PROPELLER HUB

TECHNICAL FIELD

This invention is directed to a pressure relief device for the cavity of a propeller hub, and more particularly to a pressure relief device that serves as ball hole loading cover in a propeller hub and is designed to relieve the hub internal pressure at a predetermined value.

BACKGROUND ART

Typical propulsion systems in modern aircraft comprise a propeller, propeller blades mounted in arm bores extending from the propeller hub and a pitch change actuator for changing the pitch of the propeller blades.

The propeller blade is mounted in the arm bore for movement therein. Blade retention bearings are located circumferentially within the arm bore such to facilitate pitch change of the propeller blade. The hub is sealed and contains a specified volume of oil to lubricate the blade retention bearings. The minimum oil volume is chosen to minimize weight and ensure the arm bores are completely filled and oil distributes evenly within the cavity when acted on by centrifugal force.

The pitch change actuation device uses high pressure hydraulic fluid applied to piston located within the pitch change actuator to change blade pitch. A leak in the pitch change actuator could cause the hub to become pressurized causing high loads on the propeller components. Pitch change actuation systems are designed to place the blade in a feather position to minimize drag upon loss of hydraulic pressure. Therefore it is more desirable to vent the hub cavity and lose pitch change capability than to pressurize the hub.

There are several prior art methods for limiting hub cavity pressure. Some systems vent the hub cavity back to a sump in the control system. If the cavity is a closed system, a pressure relief device is employed to vent the system overboard. This device can be a valve, or a component designed to fail at a predetermined pressure. FIGS. 1 and 2 illustrate prior art relief valves designed to open at a predetermined pressure. Pressure relief valves add expense and increase system weight because a mounting interface must be provided for the valve. Relief valves are also typically low flow devices, and therefore provide minimal over pressure protection in the event that there is a high flow rate leak into the hub cavity.

FIG. 1 illustrates a pressure relief device 10' wherein the cover 12' is designed to fracture releasing the spherical seal 14' to vent the hub cavity. The spherical seal 14' is located in a cavity 16' which is in fluid communication with the hub cavity. The cover 12' is mounted to an external surface 18' of the hub 20'. This device requires external mounting hardware and exhibits wide tolerances in activation pressure due to its configuration and dimensional tolerances.

FIG. 2 illustrates a second pressure relief device 22' positioned in a passage 24' located within the hub 26'. The pressure relief device requires a housing 28' which is attached to the hub 26'.

Therefore, there exists a need for a pressure relief device that provides relief for a rapid increase of oil pressure in the hub, due to high flow rate leakage into the hub, while minimizing weight and the need for external mounting bosses and hardware.

DISCLOSURE OF THE INVENTION

The primary object of the present invention is to provide a pressure relief device which is actuated a predictable pressure for a hub cavity. Another object of the present invention is to provide a pressure relief device that mounts in the ball loading hole of a bearing race, requiring no external mounting features.

The pressure relief device according to the subject invention includes a housing adapted in size and shape to fit in a ball loading hole of a propeller hub. The housing is cylindrical in shape and is open at a first end and closed at a second end. The outer wall of the housing includes a first portion having a first circumference located at a first end and a second portion located at a second end having a second circumference. The second circumference is greater than the first circumference, creating a stepped portion at the intersection of the first and second circumferences. An o-ring is located on the first portion adjacent the stepped portion.

The second end comprises a thin walled diaphragm which forms the closure at the second end. The diaphragm is designed to rupture at a predetermined pressure. In a further embodiment of the subject invention the diaphragm includes a notch or other feature to ensure activation at lower and more predictable hub pressure.

The second end also includes a pull tab to facilitate installation and removal of the pressure relief device. The pull tab is oriented relative the notch such that the forces exerted through the pull tab on the diaphragm, during installation or removal are minimized.

The wall of the ball loading hole has a third circumference located at an external opening, and a fourth circumference, located a distance from the external opening. The third circumference is greater than the fourth circumference forming a complementary step at the intersection of the third and fourth circumferences. Located just inside the ball loading hole is a channel adapted in size and shape to receive a snap ring.

The pressure relief device is inserted into the ball loading hole such that the first end of the pressure relief insert is exposed to the pressure in the hub cavity. When inserted, the o-ring forms a seal between the outer wall of the housing and the wall of the ball loading hole. The complementary step of the ball loading hole and the step of the outer wall of the housing cooperate to limit travel of the pressure relief device toward the hub cavity when the pressure within the hub cavity is less than the external pressure. The snap ring retains the pressure relief device within the ball loading hole when high pressure is present in the hub cavity.

The thin walled diaphragm is designed to rupture at a desired pressure to vent the pressure within the hub cavity. When present the diaphragm ruptures at the notch located on a surface of the thin walled diaphragm.

BEST MODE FOR CARRYING OUT THE INVENTION

Figure 1:
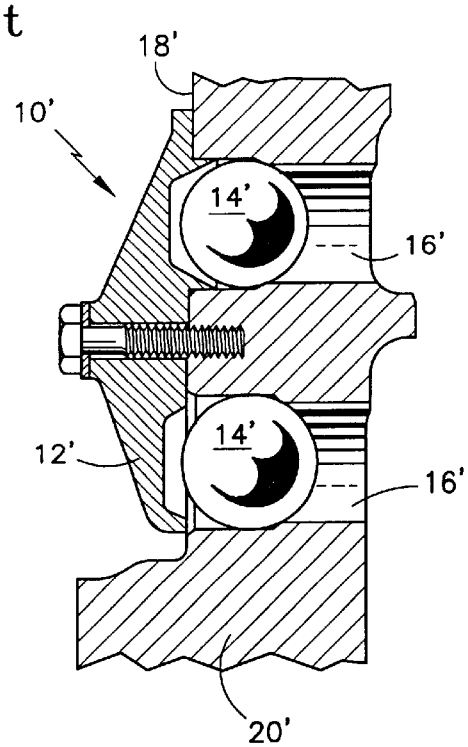
FIG. 1 is a sectional view of a prior art pressure relief device.
Figure 2:
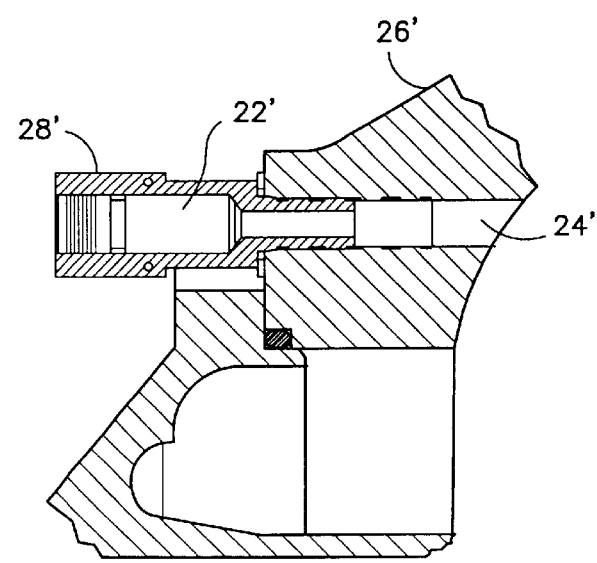
FIG. 2 is a sectional view of a prior art pressure relief device.
Figure 3:
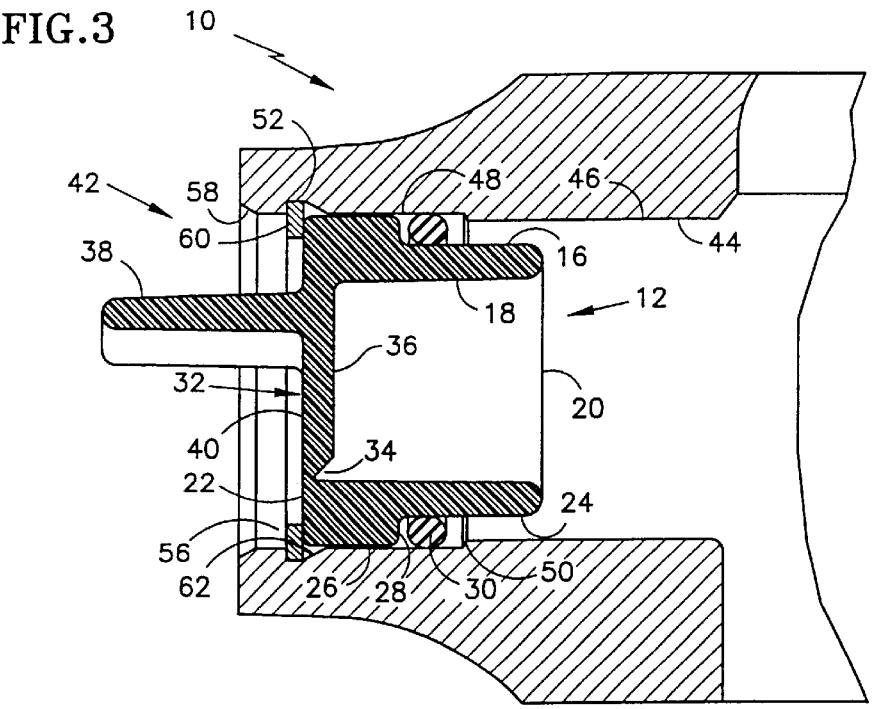
FIG. 3 is a right end view of FIG. 3 showing a pressure relief device according to the present invention.
Figure 4:
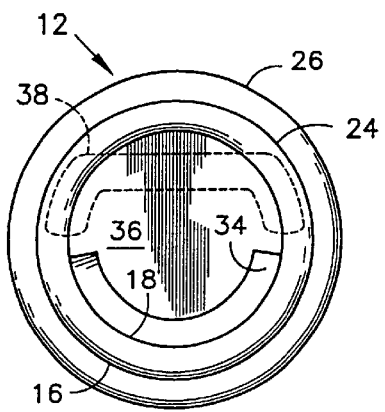
FIG. 4 is a sectional view of the diaphragm of the present invention along 4—4; and, FIG. 5 is a perspective view of a pressure relief device according to the present invention.
Figure 5:
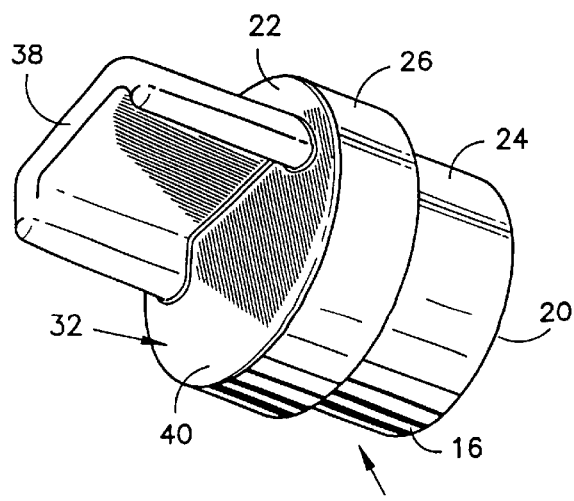

Referring now to the drawings in detail there is shown in FIG. 3 a sectional view of a pressure relief device 10 according to the present invention. The pressure relief device 10 consists of a housing 12, which is cylindrical in shape and includes an outer wall 16 and an innerwall 18. The housing is open at a first 20 and closed a second end 22. The outer wall 16 has a first portion 24 adjacent the first end 20 having a first circumference and second portion 26 adjacent the second end 22 having a second circumference greater than first circumference. A stepped portion 28 is created at the intersection of the first 24 and second 26 portions. An o-ring 30 is positioned on first portion 24 adjacent stepped portion 28.

As shown in FIG. 3, the second end 22 includes a diaphragm 32 which seals second end 22. In an alternate embodiment, a notch 34 is formed on a first surface 36 of diaphragm 32 to ensure activation at a lower more predictable value of hub pressure. A pull tab 38 is located on an second surface 40 of the diaphragm 32, to aid in installation and removal of the pressure relief device 10.

The ball loading hole 42 is formed in the arm bore arm of a hub (not shown). The inner wall 44 of the ball loading hole 42 consists of a first portion 46 having a first circumference and a second portion 48, located nearest an external opening 56 of the ball loading hole 42, having second circumference. The first circumference and second circumference are sized to receive the pressure relief device such that when inserted the o-ring 30 forms a seal there between. The second circumference is greater than the first circumference creating a complementary stepped portion 50 at the intersection of the first 46 and second 48 portions.

The complementary stepped portion 50 cooperates with the stepped portion 28 of housing 12 to prevent movement of the pressure relief device 10 toward the hub cavity (not shown) in the event that the pressure external to the hub is greater than the pressure in the hub cavity.

A groove or channel 52 is located inside in the inner wall 44 of the second portion 48 proximate the external opening 56 of the ball loading hole 42. A first chamfer 58 is formed in the second portion 48 at the external opening 56. The first chamfer 58 facilitates insertion of the pressure relief device 10 into the ball loading hole 42 and prevents damage to the o-ring 30. A snap ring 60 is inserted into groove or channel 52 after the pressure relief device 10 is inserted into the ball loading hole 42. Channel 52 includes a second chamfer 62 that also facilitates insertion of the pressure relief device 10. The snap ring 60 prevents the pressure relief device 10 from being forced out of the ball loading hole 42 in the event that the pressure external to the hub is less than the hub cavity pressure.

In operation the pressure relief device 10 is inserted in the ball loading hole 42 of the bore arm. The o-ring 30 forms a seal between the inner wall 44 of the ball loading hole 42 and the outer wall 16 of the housing 12. The snap ring 60 prevents the pressure relief device 10 from being forced out of the ball loading hole 42 while the stepped portion 28 of the housing 12 in cooperation with the complementary stepped portion 50 of the inner wall 44 of the ball loading hole 42 prevents the pressure relief device 10 from being forced into the hub cavity.

In the event that hub cavity pressure exceeds the design pressure of the diaphragm 32, the diaphragm 32 will rupture, thus venting the hub cavity to an external pressure. In another embodiment of the present invention the diaphragm 32 will rupture along the notch 34.

In the preferred embodiment the pressure relief device is formed of a single piece by injection molding of a moldable material such as DELRIN®, which is an acetal resin, by Dupont. However, other embodiments may consist of a two piece construction where the diaphragm 32 and housing 12 are two separate items which are sealably joined.

The primary advantage of the present invention is to provide a pressure relief device which is actuated a predictable pressure for a hub cavity.

Another advantage of the present invention is to provide a pressure relief device that mounts in the ball loading hole of a bearing race, requiring no external mounting features.

Although the invention has been shown and described with respect to a best mode embodiment thereof, it should be understood by those skilled in the art that the foregoing and various other changes, omissions, and additions in the form and detail thereof may be made without departing from the spirit and scope of the invention.

What is claimed is:

1. A pressure relief system for a propeller hub, the propeller hub including a chamber; and a bore arm for mounting a propeller blade therein, the bore arm including a plurality of bearings for facilitating movement of the propeller blade, wherein the bore arm is in fluid communication with the chamber for providing lubricant to the plurality of bearings, the bore arm further including a ball loading hole for removal and installation of the plurality of bearings, said pressure relief system comprising:
    a first housing for sealably engaging a wall of the ball loading hole; and
    a diaphragm for sealably engaging said housing to seal the chamber, wherein said diaphragm ruptures at a pressure to vent the chamber.

2. The pressure relief device of claim 1 wherein said pressure relief device comprises an o-ring for sealably engaging said first housing when said pressure relief insert is inserted in said cavity.

3. The pressure relief device of claim 1 wherein said cylindrical wall comprises a step and wherein said wall of said ball loading hole comprises a complementary step for engaging said step to fix the position of said first pressure relief device relative the ball loading hole.

4. The pressure relief device of claim 1 wherein said first housing and said pressure relief insert comprise a moldable material.

5. The pressure relief device of claim 1 wherein said moldable material comprises an acetal resin.

6. The pressure relief device of claim 1 wherein said diaphragm and said housing are formed of a single piece.

7. The pressure relief device of claim 1 wherein said diaphragm comprises a notch for causing said diaphragm to rupture along said notch.

* * * * *